United States Patent [19]

Oyama et al.

[11] Patent Number: 4,968,753
[45] Date of Patent: Nov. 6, 1990

[54] ACRYLONITRILE RUBBER WITH QUINOLINE COMPOUND, ORGANIC PEROXIDE, CROSSLINKING AGENT

[75] Inventors: Motofumi Oyama, Yokosuka; Tetsu Ohishi, Tokyo, both of Japan

[73] Assignee: Nippon Zeon Co., Ltd., Tokyo, Japan

[21] Appl. No.: 218,553

[22] Filed: Jul. 13, 1988

[51] Int. Cl.$^5$ .................. C08F 267/08; C08F 236/12; C08F 8/00
[52] U.S. Cl. .................................... 525/274; 525/281; 525/282; 525/305; 525/330.5; 525/375
[58] Field of Search ............ 525/281, 282, 305, 329.3, 525/330.5, 330.3

[56] References Cited

U.S. PATENT DOCUMENTS 3,960,988  6/1976  Kent ..................................... 525/281
4,774,295  9/1988  Buding et al. ............................. 525/

FOREIGN PATENT DOCUMENTS 0144805    6/1985   European Pat. Off. .
0272071    6/1988   European Pat. Off. .
1191961    4/1965   Fed. Rep. of Germany .
62-153378  7/1987   Japan .
853640    11/1960   United Kingdom .

*Primary Examiner*—Christopher Henderson
*Attorney, Agent, or Firm*—Sherman and Shalloway

[57] ABSTRACT

A rubber composition capable of giving a vulcanizate having improved ozone resistance. The composition comprises a nitrile group-containing highly saturated polymer rubber having an iodine value of not more than 80, an organic peroxide, a crosslinking coagent and a quinoline-type stabilizer.

6 Claims, No Drawings

ACRYLONITRILE RUBBER WITH QUINOLINE COMPOUND, ORGANIC PEROXIDE, CROSSLINKING AGENT

This invention relates to an improvement in a nitrile group-containing highly saturated polymer rubber containing an organic peroxide as a vulcanization system.

Nitrile group-containing highly saturated polymer rubbers having heat resistance and oil resistance are recognized in the art as rubber materials meeting the high levels of requirements and used in various applications mainly as rubber parts in automobiles.

The above rubbers have a small content of double bonds in the molecular chains, but if they do not contain an ozone cracking inhibitor, they give vulcanizates having very poor ozone cracking resistance. When these rubbers are to be vulcanized with a sulfur vulcanization system, a p-phenylenediamine compound such as N-isopropyl-N'-phenyl-p-phenylenediamine, which produces an excellent effect as an ozone cracking inhibitor for vulcanizates of NBR (acrylonitrile-butadiene copolymer rubber), a typical conventional nitrile group-containing polymer rubber, or other rubbers, is likewise effectively used as an ozone cracking inhibitor. With organic peroxides, however, the use of the p-phenylenediamine compound cannot impart ozone cracking resistance to vulcanizates of the above nitrile group-containing highly saturated polymer rubbers, and moreover, the crosslinking efficiency is reduced.

It is an object of this invention therefore to obtain a vulcanizate having improved ozone resistance from a nitrile group-containing highly saturated polymer rubber composition containing an organic peroxide as a vulcanization system.

The present inventors have found, as a result of conducting research in order to achieve the above object, that when combined with a quinoline-type stabilizer and a crosslinking coagent, the above composition gives a vulcanizate having improved ozone resistance.

Thus, the present invention provides a rubber composition comprising a nitrile group-containing highly saturated polymer rubber having an iodine value of not more than 80, an organic peroxide, a crosslinking coagent and a quinoline-type stabilizer.

The nitrile group-containing highly saturated polymer used in this invention has a nitrile group-containing monomer unit content of usually 5 to 60% by weight because of the need for oil resistance, and this content may be properly chosen within this range according to the use of the rubber (type of the solvent or oil with which it makes contact). For improved ozone resistance, it is also necessary for the rubber to have an iodine value, determined by JIS K-0070, of not more than 80. If the iodine value of the rubber exceeds 80, the present invention cannot give excellent ozone resistance. Preferably, the iodine value of the rubber is in the range of 0 to 60.

Examples of the nitrile group-containing highly saturated polymer rubber include rubbers obtained by hydrogenating the conjugated diene units of unsaturated nitrile/conjugated diene copolymers, unsaturated nitrile/conjugated diene/ethylenically unsaturated monomer terpolymers, rubbers obtained by hydrogenating the conjugated diene units of the above terpolymers, and unsaturated nitrile/ethylenically unsaturated copolymer rubbers. These nitrile group-containing highly saturated polymer rubbers may be obtained by ordinary polymerization techniques and ordinary hydrogenation techniques. Needless to say, the method of producing the above rubbers is not particularly restricted in the present invention.

Examples of the monomers used to produce these nitrile group-containing highly saturated polymer rubbers are shown below.

The unsaturated nitrile may be, for example, acrylonitrile and methacrylonitrile.

Examples of the conjugated diene are 1,3-butadiene, 2,3-dimethylbutadiene, isoprene and 1,3-pentadiene.

Examples of the ethylenically unsaturated monomer include unsaturated carboxylic acids such as acrylic acid, methacrylic acid, itaconic acid and maleic acids, and their salts; esters of the above carboxylic acids such as methyl acrylate and 2-ethylhexyl acrylate; alkoxyalkyl esters of the above unsaturated carboxylic acids such as methoxymethyl acrylate, ethoxyethyl acrylate and methoxyethoxyethyl acrylate; cyano-substituted alkyl esters of (meth)acrylic acid such as cyanomethyl (meth)acrylate, 2-cyanoethyl (meth)acrylate, 1-cyanopropyl (meth)acrylate, 2-ethyl-6-cyanohexyl (meth)acrylate and 3-cyanopropyl acrylate; and (meth)acrylamide and N-substituted (meth)acrylamides such as N-methylol (meth)acrylamide, N,N'-dimethylol (meth)acrylamide and N-ethoxymethyl (meth)acrylamide.

The unsaturated nitrile/ethylenically unsaturated monomer-type copolymer rubber may be a copolymer rubber obtained by using a non-conjugated diene such as vinylnorbornene, dicyclopentadiene or 1,4-hexadiene in place of part of the ethylenically unsaturated monomer.

Specific examples of the nitrile group-containing highly unsaturated polymer rubber used in this invention are a hydrogenated product of a butadiene/acrylonitrile copolymer rubber, a hydrogenation product of an isoprene/butadiene/acrylonitrile copolymer rubber, a hydrogenation product of an isoprene/acrylonitrile copolymer rubber, a butadiene/methyl acrylate/acrylonitrile copolymer rubber, a hydrogenation product of this copolymer rubber, a butadiene/acrylic acid/acrylonitrile copolymer rubber, a hydrogenation product of this copolymer rubber, a butadiene/ethylene/acrylonitrile copolymer rubber, a butyl acrylate/ethoxyethyl acrylate/vinyl chloroacetate/acrylonitrile copolymer rubber, and a butyl acrylate/ethoxyethyl acrylate/vinylnorbornene/acrylonitrile copolymer rubber.

Organic peroxides normally used in the rubber or plastic industry may be used as the organic peroxide in the present invention. Specific examples include dicumyl peroxide, di-t-butyl peroxide, t-butylcumyl peroxide, cumene hydroperoxide, benzoyl peroxide, 2,4-dichlorobenzoyl peroxide, 2,5-dimethyl-2,5-di(t-butylperoxy)hexyne-3, 1,1-di(t-butylperoxy)-3,3,5-trimethylcyclohexane, t-butyl peroxybenzoate, 2,5-dimethyl-2,5-di(benzoylperoxy)hexane and 1,3-di(t-butylperoxyisopropyl)benzene. The amount of the organic peroxide used is not particularly limited in this invention. Usually, it is in the range of 0.5 to 10 parts by weight per 100 parts by weight of the nitrile group-containing highly saturated polymer rubber.

For improved ozone resistance in this invention, the use of a crosslinking coagent together with the quinoline-type stabilizer to be described is essential.

The crosslinking coagent used in this invention may be any of those used in ordinary vulcanization with an organic peroxide. Examples include polyfunctional monomers such as triallyl cyanurate, triallyl isocyanurate, trimethylolpropane trimethacrylate, ethylene dimethacrylate, magnesium dimethacrylate, divinylbenzene, diallyl phthalate, toluylene bismaleimide and m-phenylene bismaleimide; liquid polybutadiene; and oxime compounds such as p-quinone dioxime and p,p'-dibenzoylquinone dioxime. The amount of the crosslinking coagent used is usually 0.1 to 15 parts by weight, preferably 1 to 5 parts by weight, per 100 parts by weight of the rubber.

Stabilizers used in this invention to improve ozone resistance must be stabilizers of the quinoline type. The object of this invention cannot be achieved by using stabilizers of the p-phenylenediamine type which are known to produce a marked effect as stabilizers against ozone degradation.

Non-limitative examples of the quinoline-type stabilizers used in this invention are 2,2,4-trimethyl1,2-dihydroquinoline, its polymer, 6-methoxy-2,2,4-trimethyl-1,2-dihydroquinoline, 6-ethoxy-2,2,4-trimethyl1,2-dihydroquinoline, 6-dodecyl-2,2,4-trimethyl-1,2-dihydroquinoline and 6-phenyl-2,2,4-trimethyl-1,2-dihydroquinoline. The amount of the quinoline-type stabilizer is usually 0.1 to 5 parts by weight, per 100 parts by weight of the rubber.

Waxes normally used for improved ozone resistance may be used together with the quinoline-type stabilizer in this invention.

The rubber composition of this invention can be produced by kneading the nitrile group-containing highly saturated polymer rubber having an iodine value of not more than 80, the organic peroxide, the crosslinking coagent and the quinoline-type stabilizer and as required, chemicals normally used in the rubber industry, for example reinforcing agents such as carbon black of various grades and silica, fillers such as calcium carbonate and talc, plasticizers, processing aids, and antioxidants, by an ordinary mixing machine such as a Banbury mixer. The rubber composition of this invention so obtained may be molded, for example, into a sheet, hose, tube or belt, or a sheet structure having a metallic or fibrous reinforcing layer inserted between sheets, by using an ordinary molding machine. The molded articles are vulcanized by such means as press vulcanization or can vulcanization to give the desired rubber products.

The vulcanizates obtained from the rubber composition of this invention has improved ozone resistance in addition to good heat resistance and oil resistance which are the characteristic features of the nitrile group-containing highly saturated hydrocarbon rubber. By dint of these useful properties, the vulcanizates may be used in various applications, for example in the production of various sealing materials such as an O-ring, packing or gasket, various types of hoses, diaphragms, valves, packers and blow out preventers (B.O.P.) used in oil wells, transportation belts, timing belts, V belts, and rubber rolls.

The following examples illustrate the present invention in detail.

Example 1

Acrylonitrile/butadiene copolymer rubber (NBR) having a bound acrylonitrile content of 41% by weight was dissolved in methyl isobutyl ketone, and hydrogenated partially using a Pd-carbon catalyst to give hydrogenated NBR having an iodine value of 25.

The hydrogenated NBR and the various compounding chemicals indicated in Table 1 were kneaded on a roll to form a rubber compound. The compound was heated under pressure at 170° C. for 15 minutes to give a vulcanizate. The properties of the vulcanizate were measured in accordance with JIS K-6301. The ozone resistance was expressed by the cracking occurrence time which denotes the time that elapsed until cracking occurred in an ozone degradation test conducted in accordance with JIS K-6301 under conditions involving a temperature of 40° C., an ozone concentration of 50 pphm and a sample elongation of 20%. The results are shown in Table 1.

TABLE 1

| | | Invention | | | | | | | |
|---|---|---|---|---|---|---|---|---|---|
| Run No. | | 1 | 2 | 3 | 4 | 5 | 6 | 7 | 8 |
| Compounding recipe (parts by weight) | Rubber | 100 | → | → | → | → | → | → | → |
| | FEF carbon black | 40 | | | | | | | |
| | Di(butoxyethoxyethyl)adipate (plasticizer) | 10 | | | | | | | |
| | Peroxide Peroximon F-40 (*1) | 6 | 6 | 6 | 6 | 6 | 6 | 6 | 6 |
| | Crosslinking coagent Triallyl isocyanurate | 3 | | | | | | | |
| | Trimethylolpropane trimethacrylate | | 3 | | | | | 3 | 1 |
| | Ethylene dimethacrylate | | | 3 | | | | | |
| | Magnesium dimethacrylate | | | | 3 | | | | |
| | m-Phenylene bismaleimide | | | | | 3 | | | |
| | p,p'-Dibenzoylquinone dioxime | | | | | | 3 | | |
| | Stabilizer 6-Ethoxy-2,2,4-trimethyl-1,2-dihydroquinoline | | | | | | | 2 | |
| | Polymer of 2,2,4-trimethyl-1,2-dihydroquinoline (*2) | 1 | 1 | 1 | 1 | 1 | 1 | | 2 |
| | N-isopropyl-N'-phenyl-p-phenylenediamine | | | | | | | | |
| | N,N'-diphenyl-p-phenylenediamine | | | | | | | | |
| | Sulfur vulcanizer Sulfur | | | | | | | | |
| | Tetramethylthiuram disulfide | | | | | | | | |
| | 2-Mercaptobenzothiazole | | | | | | | | |
| Physical properties | Tensile strength (kg/cm$^2$) | 181 | 194 | 171 | 192 | 186 | 187 | 201 | 195 |
| | Elongation (%) | 380 | 350 | 360 | 390 | 380 | 410 | 370 | 400 |
| | 100% tensile stress (kg/cm$^2$) | 22 | 25 | 23 | 24 | 22 | 21 | 24 | 21 |
| | Hardness (JIS) | 63 | 65 | 63 | 66 | 65 | 63 | 64 | 63 |
| | Ozone degradation test | | | | | | | | |
| | Cracking occurrence time (hours) | 480 | 480 | 480 | 504 | 360 | 484 | No cracking before 600 | No cracking before 600 |

| | | Comparison | | | | |
|---|---|---|---|---|---|---|
| Run No. | | 9 | 10 | 11 | 12 | 13 |

TABLE 1-continued

| Compounding recipe (parts by weight) | | | | | | | |
|---|---|---|---|---|---|---|---|
| | Rubber | | 100 | | | | |
| | FEF carbon black | | 40 | → | → | → | → |
| | Di(butoxyethoxyethyl)adipate (plasticizer) | | 10 | | | | |
| | Peroxide | Peroximon F-40 (*1) | 6 | 6 | 6 | 6 | 6 |
| | Cross-linking coagent | Triallyl isocyanurate | | | | | |
| | | Trimethylolpropane trimethacrylate | 3 | | 3 | 3 | |
| | | Ethylene dimethacrylate | | | | | |
| | | Magnesium dimethacrylate | | | | | |
| | | m-Phenylene bismaleimide | | | | | |
| | | p,p'-Dibenzoylquinone dioxime | | | | | |
| | Stabilizer | 6-Ethoxy-2,2,4-trimethyl-1,2-dihydroquinoline | | | | | |
| | | Polymer of 2,2,4-trimethyl-1,2-dihydroquinoline (*2) | | 2 | | | |
| | | N-isopropyl-N'-phenyl-p-phenylenediamine | | | 1 | 1 | 1.5 |
| | | N,N'-diphenyl-p-phenylenediamine | | | | 1 | |
| | Sulfur vulcanizer | Sulfur | | | | | |
| | | Tetramethylthiuram disulfide | | | | | |
| | | 2-Mercaptobenzothiazole | | | | | |
| Physical properties | Tensile strength (kg/cm²) | | 206 | 199 | 145 | 168 | 136 |
| | Elongation (%) | | 340 | 420 | 870 | 670 | 980 |
| | 100% tensile stress (kg/cm²) | | 31 | 19 | 13 | 17 | 11 |
| | Hardness (JIS) | | 69 | 63 | 59 | 61 | 58 |
| | Ozone degradation test | | | | | | |
| | Cracking occurrence time (hours) | | 48 | 72 | 48 | 72 | 36 |

| | | | | | Reference | | |
|---|---|---|---|---|---|---|---|
| | Run No. | | 14 | 15 | 16 | 17 | 18 |
| Compounding recipe (parts by weight) | Rubber | | | | | | |
| | FEF carbon black | | → | → | → | → | → |
| | Di(butoxyethoxyethyl)adipate (plasticizer) | | | | | | |
| | Peroxide | Peroximon F-40 (*1) | — | — | — | — | — |
| | Cross-linking coagent | Triallyl isocyanurate | | | | | |
| | | Trimethylolpropane trimethacrylate | | | | | |
| | | Ethylene dimethacrylate | | | | | |
| | | Magnesium dimethacrylate | | | | | |
| | | m-Phenylene bismaleimide | | | | | |
| | | p,p'-Dibenzoylquinone dioxime | | | | | |
| | Stabilizer | 6-Ethoxy-2,2,4-trimethyl-1,2-dihydroquinoline | 2 | | | | |
| | | Polymer of 2,2,4-trimethyl-1,2-dihydroquinoline (*2) | | 1 | 2 | | |
| | | N-isopropyl-N'-phenyl-p-phenylenediamine | | | | 1.5 | |
| | | N,N'-diphenyl-p-phenylenediamine | | | | | 1 |
| | Sulfur vulcanizer | Sulfur | 0.5 | | | | |
| | | Tetramethylthiuram disulfide | 1.5 | → | → | → | → |
| | | 2-Mercaptobenzothiazole | 0.5 | | | | |
| Physical properties | Tensile strength (kg/cm²) | | 182 | 179 | 187 | 183 | 196 |
| | Elongation (%) | | 510 | 490 | 510 | 510 | 500 |
| | 100% tensile stress (kg/cm²) | | 25 | 26 | 25 | 22 | 30 |
| | Hardness (JIS) | | 65 | 65 | 64 | 64 | 65 |
| | Ozone degradation test | | | | | | |
| | Cracking occurrence time (hours) | | 120 | 480 | No cracking before 60 | No cracking before 600 | No cracking before 600 |

(*1): a product of Montedison (α,α'-bis-t-butyl peroxide of m,p-diisopropylbenzene)
(*2): NONFLEX RD (a product of Seikoh Chemical Co., Ltd.)

Example 2

Acrylonitrile/butadiene copolymer rubber (NBR) obtained by emulsion polymerization and butadiene/butyl acrylate/acrylonitrile terpolymer were each dissolved in methyl isobutyl ketone, and hydrogenated using a Pd carbon catalyst to prepare hydrogenated NBR samples and hydrogenated acrylonitrile/butadiene/butyl acrylate terpolymer rubber samples having the iodine values indicated in Table 2.

TABLE 2

| | Hydrogenated rubber | | | | | | | |
|---|---|---|---|---|---|---|---|---|
| | Acrylonitrile/butadiene copolymer rubber | | | | | Acrylonitrile/butadiene/butyl acrylate terpolymer | | |
| Composition | A | B | C | D | E (*3) | F | G | H |
| Bound-acrylonitrile (wt. %) | 50 | 37 | 37 | 33 | 33 | 35 | 35 | 35 |
| Butyl acrylate units (wt. %) | — | — | — | — | — | 60 | 35 | 35 |
| Iodine value | 20 | 1 | 28 | 70 | 308 | 23 | 138 | 23 |

(*3): nonhydrogenated NBR

Each of these rubbers was kneaded with the compounding chemicals indicated in Table 3 to obtain a rubber compound. The compound was vulcanized, and the properties of the vulcanizate were measured in the same way as in Example 1. The results are shown in Table 4.

TABLE 3

| Compounding chemicals (parts by weight) | (i) | (ii) | (iii) | (iv) | (v) | (vi) | (vii) | (viii) | (ix) |
|---|---|---|---|---|---|---|---|---|---|
| Rubber | 100 | → | → | → | → | → | → | → | → |
| FEF carbon black | 40 | → | → | → | → | → | → | → | → |
| Di(butoxyethoxyethyl)adipate (plasticizer) | 10 | → | → | → | → | → | → | → | → |
| Dicumyl peroxide (content 40% by weight) | 8 | 8 | 8 | 8 | 8 | 8 | — | — | — |
| Trimethylolpropane trimethacrylate | 3 | 5 | 3 | — | — | 3 | — | — | — |
| Sulfur | | | | | | | 0.5 | → | → |
| Tetramethylthiuram disulfide | | | | | | | 1.5 | → | → |
| 2-Mercaptobenzothiazole | | | | | | | 0.5 | → | → |
| 6-Ethoxy-2,2,4-trimethyl-1,2-dihydroquinoline | — | — | — | — | — | — | 1 | — | — |
| Polymer of 2,2,4-trimethyl-1,2-dihydroquinoline (*2) | 1 | 2 | — | 1 | — | — | — | 1 | — |
| N-isopropyl-N'-phenyl-p-phenylenediamine | — | — | — | — | — | 1 | — | — | 1 |
| Wax | 0.5 | → | → | → | → | → | → | → | → |

TABLE 4

| | Invention | | | | | | | | Comparison | | | | |
|---|---|---|---|---|---|---|---|---|---|---|---|---|---|
| Run No. | 19 | 20 | 21 | 22 | 23 | 24 | 25 | 26 | 27 | 28 | 29 | 30 | 31 |
| Rubber No. | A | B | C | C | D | F | H | H | E | G | E | E | E |
| Compounding No. | (i) | (i) | (i) | (ii) | (i) | (i) | (i) | (ii) | (i) | (i) | (iii) | (iv) | (v) |
| *Tensile test* | | | | | | | | | | | | | |
| Tensile strength (kg/cm$^2$) | 214 | 234 | 197 | 206 | 218 | 186 | 202 | 207 | 183 | 186 | 148 | 165 | 175 |
| Elongation (%) | 400 | 440 | 380 | 350 | 360 | 390 | 400 | 340 | 350 | 430 | 180 | 380 | 360 |
| 100% tensile stress (kg/cm$^2$) | 25 | 23 | 23 | 27 | 25 | 22 | 24 | 27 | 28 | 23 | 83 | 26 | 27 |
| Hardness (JIS) | 65 | 63 | 64 | 68 | 63 | 64 | 65 | 69 | 65 | 63 | 67 | 64 | 64 |
| *Ozone degradation test* | | | | | | | | | | | | | |
| Cracking occurrence time (hours) | 480 | No cracking before 600 | No cracking before 600 | 360 | 240 | 480 | 528 | 384 | 8 | 24 | 8 | 8 | 8 |

| | Comparison | | | | | Reference | | | | | |
|---|---|---|---|---|---|---|---|---|---|---|---|
| Run No. | 32 | 33 | 34 | 35 | 36 | 37 | 38 | 39 | 40 | 41 | 42 |
| Rubber No. | E | C | C | C | C | E | E | E | H | H | H |
| Compounding No. | (vi) | (iii) | (iv) | (v) | (vi) | (vii) | (viii) | (ix) | (vii) | (viii) | (ix) |
| *Tensile test* | | | | | | | | | | | |
| Tensile strength (kg/cm$^2$) | 173 | 221 | 202 | 229 | 241 | 187 | 189 | 186 | 196 | 193 | 199 |
| Elongation (%) | 400 | 390 | 420 | 410 | 680 | 490 | 510 | 520 | 490 | 520 | 530 |
| 100% tensile stress (kg/cm$^2$) | 24 | 26 | 23 | 25 | 19 | 24 | 25 | 22 | 23 | 23 | 21 |
| Hardness (JIS) | 63 | 67 | 65 | 66 | 64 | 63 | 62 | 62 | 67 | 66 | 66 |
| *Ozone degradation test* | | | | | | | | | | | |
| Cracking occurrence time (hours) | 8 | 12 | 48 | 8 | 24 | 8 | 8 | 24 | 80 | No cracking before 600 | No cracking before 600 |

What is claimed is:

1. A rubber composition capable of giving a vulcanizate having improved ozone resistance, said composition comprising
   100 parts by weight of a nitrile group-containing highly saturated polymer rubber having an iodine value of not more than 80,
   0.5 to 10 parts by weight of an organic peroxide,
   0.1 to 15 parts by weight of a crosslinking coagent, and
   0.1 to 5 parts by weight of a quinoline-type stabilizer.

2. The rubber composition of claim 1 wherein the nitrile-containing highly saturated polymer rubber is at least one rubber selected from the group consisting of rubbers obtained by hydrogenating the conjugated diene units of unsaturated nitrile/conjugated diene copolymers, unsaturated nitrile/conjugated diene/ethylenically unsaturated monomer terpolymers, rubbers obtained by hydrogenating the conjugated diene units of the above terpolymers, and unsaturated nitrile/ethylenically unsaturated copolymer rubbers.

3. The rubber composition of claim 1 wherein the crosslinking coagent is at least one compound selected from the group consisting of polyfunctional monomers, liquid polybutadiene and oxime compounds.

4. The rubber composition of claim 1 wherein the nitrile group-containing highly saturated polymer rubber has a nitrile group-containing monomer unit content of 5 to 60% by weight.

5. The rubber composition of claim 1 wherein the iodine value of the nitrile group-containing highly saturated polymer rubber is in the range of 0 to 60.

6. The rubber composition of claim 1 wherein the nitrile group-containing highly saturated polymer rubber is selected from the group consisting of hydrogenated butadiene/acrylonitrile copolymer rubber, hydrogenated isoprene/butadiene/acrylonitrile copolymer rubber, hydrogenated isoprene/acrylonitrile copolymer rubber, butadiene/methyl acrylate/acrylonitrile copolymer rubber, hydrogenated butadiene/methyl acrylate/acrylonitrile copolymer rubber, butadiene/acrylic acid/acrylonitrile copolymer rubber, hydrogenated butadiene/acrylic acid/acrylonitrile copolymer rubber, butadiene/ethylene/acrylonitrile copolymer rubber, butyl acrylate/ethoxyethyl acrylate/vinyl chloroacetate/acrylonitrile copolymer rubber and butyl acrylate/ethoxyethyl acrylate/vinylnorbornene/acrylonitrile copolymer rubber.

* * * * *